(12) United States Patent
Sivasubramanian et al.

(10) Patent No.: US 9,599,040 B2
(45) Date of Patent: Mar. 21, 2017

(54) FUEL APPORTIONMENT FOR MULTI FUEL ENGINE SYSTEM

(71) Applicant: Caterpillar Motoren GmbH & Co. KG, Peoria, IL (US)

(72) Inventors: Arvind Sivasubramanian, Peoria, IL (US); Christopher F. Gallmeyer, Chillicothe, IL (US); Eike J. Sixel, Kiel (DE); Bert Ritscher, Kiel (DE)

(73) Assignee: Caterpillar Motoren GmbH & Co. KG, Kiel (DE)

( * ) Notice: Subject to any disclaimer, the term of this patent is extended or adjusted under 35 U.S.C. 154(b) by 364 days.

(21) Appl. No.: 14/288,543

(22) Filed: May 28, 2014

(65) Prior Publication Data

US 2015/0345408 A1 Dec. 3, 2015

(51) Int. Cl.
*F02D 19/06* (2006.01)

(52) U.S. Cl.
CPC ...... *F02D 19/0607* (2013.01); *F02D 19/0626* (2013.01); *Y02T 10/36* (2013.01)

(58) Field of Classification Search
CPC ... F02D 19/0607; F02D 19/0626; Y02T 10/36
See application file for complete search history.

(56) References Cited

U.S. PATENT DOCUMENTS

| | | |
|---|---|---|
| 2,509,960 A | 5/1950 | Calhoun |
| 2,612,145 A | 9/1952 | Steven |
| 2,781,030 A | 2/1957 | Miller |
| 2,791,988 A | 5/1957 | Fischer |
| 5,224,457 A | 7/1993 | Arsenault et al. |
| 5,450,829 A | 9/1995 | Beck |
| 5,911,210 A | 6/1999 | Flach |
| 7,007,661 B2 | 3/2006 | Warlick |
| 7,044,103 B2 | 5/2006 | May |
| 7,509,209 B2 | 3/2009 | Davis et al. |
| 2007/0079598 A1* | 4/2007 | Bailey ................ F02D 41/0052 60/278 |
| 2012/0210988 A1 | 8/2012 | Willi |

FOREIGN PATENT DOCUMENTS

| | | |
|---|---|---|
| EP | 0197080 | 3/1990 |
| EP | 0557927 | 11/1993 |
| EP | 1602813 | 12/2005 |
| GB | 753308 | 7/1956 |

* cited by examiner

*Primary Examiner* — Lindsay Low
*Assistant Examiner* — Kevin Lathers (57) ABSTRACT

A method for controlling fuel flow in a multi fuel engine is disclosed. An input power for operating the multi fuel engine at a desired engine speed is determined and a fuel flow rate based on the input power, one or more fuel properties and a specified fuel substitution ratio for apportioning the plurality of fuels is determined. Also, a correction factor for the fuel flow rate based on a desired charge density, wherein the desired charge density is based at least on a relationship between an engine load and charge density is determined and a corrected fuel flow rate, based on the determined correction factor, is output to a corresponding actuator of a fluid flow control device for the one of the fuels to cause the corresponding actuator to provide the one of the plurality of fuels at the corrected fuel flow rate.

20 Claims, 4 Drawing Sheets

FUEL APPORTIONMENT FOR MULTI FUEL ENGINE SYSTEM

TECHNICAL FIELD

The present disclosure relates generally to multi fuel engines capable of operating with liquid fuel, with gaseous fuel and with a mixture of liquid and gaseous fuels, and more particularly, to methods and systems for controlling the apportionment of the multiple fuels to the multi fuel engine.

BACKGROUND

A multi fuel engine refers generically to any type of engine, boiler, heater or other fuel-burning device which is designed to burn multiple types of fuels in its operation. Multi fuel engines have application in diverse areas to meet particular operational needs in the operating environment. For example, a common use of multi fuel engines is in military vehicles so that vehicles in various deployment locations may run a wide range of alternative fuels such as gasoline, diesel or aviation fuel. In combat settings, for example, enemy action or unit isolation may limit the available fuel supply and personnel may need to resort the type of fuel available for usage from enemy and civilian sources. Multi fuel engines are also desirable where cheaper fuel sources, such as natural gas, are available, but an alternative or secondary fuel, such as diesel fuel, is needed for performance reasons (e.g., faster reaction to short term load demand), as a backup in the event of an interruption in the supply of the primary fuel source, or for other operational or engine performance conditions.

A multi fuel engine typically operates with a specified mixture of the available fuels. Where a liquid-only fuel mixture is specified, a liquid fuel, such as diesel fuel, gasoline or other liquid hydrocarbon fuel, is injected directly into an engine cylinder or a pre-combustion chamber as the sole source of energy during combustion. When a liquid and gaseous fuel mixture is specified, a gaseous fuel, such as natural gas, methane, hexane, pentane or any other appropriate gaseous hydrocarbon fuel, may be mixed with air in an intake port of a cylinder and a small amount or pilot amount of liquid fuel, such as diesel fuel, is injected into the cylinder or the pre-combustion chamber in an amount according to a specified substitution ratio in order to ignite the mixture of air and gaseous fuel.

A typical engine speed controller has one controller that acts on speed error to set a fuel rate. For engines that may run on multiple fuels, it is required to set multiple fuel rates based on the fuel fraction or desired ratio of fuels. For example, it may be desired to run a multi fuel engine on a mixture of 80% natural gas and 20% diesel. However, typical speed controllers (usually proportional-integral controllers, commonly called PI controllers) may only set a fuel rate for a single fuel. The normal way to deal with a multi fuel engine is to have each PI controller set an individual fuel rate for the corresponding fuel while ignoring the fact that there are other fuels supplying power to the engine. The fuel rates are set as if the other fuels do not exist. After the individual fuel rates are set by the PI controllers, a complicated switching strategy manages the multiple fuel rates, and selects a composite fuel flow based on the specified fuel mixture. The selected composite fuel flow accounts for the availability of the other fuels. If a specific fraction of fuel is desired, such as the 80% natural gas, 20% diesel fuel mixture discussed above, the switching strategy will output multiple fuel flow rates. In this case, separate control signals will be output to the flow control devices for natural gas and diesel fuel to create the fuel flows of each fuel that are necessary for the composite fuel flow. The disadvantages of this type of control structure include the significant amount of design time and effort required for multiple PI controllers and the complexity of the switching strategy to ensure that the overall design is robust and responsive to changes in the input power requirements.

The fuel properties for the fuel may have to be manually input each time an engine tank has to be refilled. A quality of the fuel being used in the engine and the fuel tested in the lab may be different. Also, the quality of the fuel may change after operating the engine for a certain time duration. Under such circumstances, the fuel flow rate determined based on the input fuel properties may not be accurate. In view of these conditions, a need exists for an improved multi fuel engine control strategy that simplifies the process for determining the fuel flow rates for the various fuels available to provide power to the engine. A further need exists for the multi fuel engine control strategy to adjust or determine the fuel flow rate to provide the necessary power to the engine by considering the changes in fuel quality of the fuel.

SUMMARY OF THE DISCLOSURE

In one aspect of the present disclosure, a method for controlling fuel flow in a multi fuel engine is disclosed. The method may include determining an input power for operating the multi fuel engine at a desired engine speed, determining a fuel flow rate for each of a plurality of fuels available for providing power to the multi fuel engine based on the input power, one or more fuel properties of a pre-determined fuel type and a specified fuel substitution ratio for apportioning the plurality of fuels to the multi fuel engine, determining a correction factor for the fuel flow rate based on a desired charge density, wherein the desired charge density is based at least on a relationship between an engine load and charge density of the multi fuel engine and outputting a corrected fuel flow rate, based on the determined correction factor, for each of the plurality of fuels to a corresponding actuator of a fluid flow control device for the one of the plurality of fuels to cause the corresponding actuator to provide the one of the plurality of fuels to the multi fuel engine at the corrected fuel flow rate.

In another aspect of the present disclosure, a fuel flow control system for a multi fuel engine is disclosed. The engine speed control system may include an engine speed control configured to output an engine speed control signal indicating a desired engine speed, a plurality of actuators, wherein each of the plurality of actuators corresponds to a fluid flow control device for one of a plurality of fuels available for providing power to the multi fuel engine by causing a flow of the corresponding one of the plurality of fuels to the multi fuel engine, and a controller operatively connected to the engine speed control and the plurality of actuators. The controller may be configured to store one or more fuel properties of a pre-determined fuel type. The controller may also be configured to store a specified fuel substitution ratio for apportioning the plurality of fuels to the multi fuel engine, to receive the engine speed control signal from the engine speed control, and to determine an input power for operating the multi fuel engine at the desired engine speed. The controller may further be configured to determine a fuel flow rate for each of the plurality of fuels based on the input power and the specified fuel substitution ratio, to determine a correction factor for the fuel flow rate based on a desired charge density, wherein the desired charge density is based at least on a relationship between an engine load and charge density of the plurality of fuels and to output the corrected fuel flow rate for each of the plurality of fuels to the corresponding one of the plurality of actuators to cause the fluid flow control device to provide the one of the plurality of fuels to the multi fuel engine at the corrected fuel flow rate.

In a further aspect of the present disclosure, a method for controlling fuel flow in a multi fuel engine is disclosed. The method may include receiving a desired engine speed for the multi fuel engine, determining a measured engine speed for the multi fuel engine, determining a speed error based on a difference between the desired engine speed and the measured engine speed, and determining an input power for operating the multi fuel engine at the desired engine speed based on the measured engine speed and the speed error. The method may also includes determining a fuel flow rate for each of a plurality of fuels available for providing power to the multi fuel engine based on the input power and a specified fuel substitution ratio for apportioning the plurality of fuels to the multi fuel engine. The method may further include receiving an intake manifold pressure of the multi fuel engine, receiving an intake manifold temperature of the multi fuel engine, determining a calculated charge density based on the received intake manifold pressure and the received intake manifold pressure, determining a desired charge density based on a relationship of charge density with at least one of an engine load, desired air flow, measured engine speed and a type of fuel, determining a charge density error based on a difference between the calculated charge density and the desired charge density, determining a correction factor for the fuel flow rate based on the calculated charge density and the charge density error and outputting a corrected fuel flow rate, based on the correction factor, for each of the plurality of fuels to a corresponding actuator of a fluid flow control device for the one of the plurality of fuels to cause the corresponding actuator to provide the one of the plurality of fuels to the multi fuel engine at the fuel flow rate.

Additional aspects are defined by the claims of this patent.

DETAILED DESCRIPTION

Although the following text sets forth a detailed description of numerous different embodiments of the present disclosure, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112(f).

Figure 1:
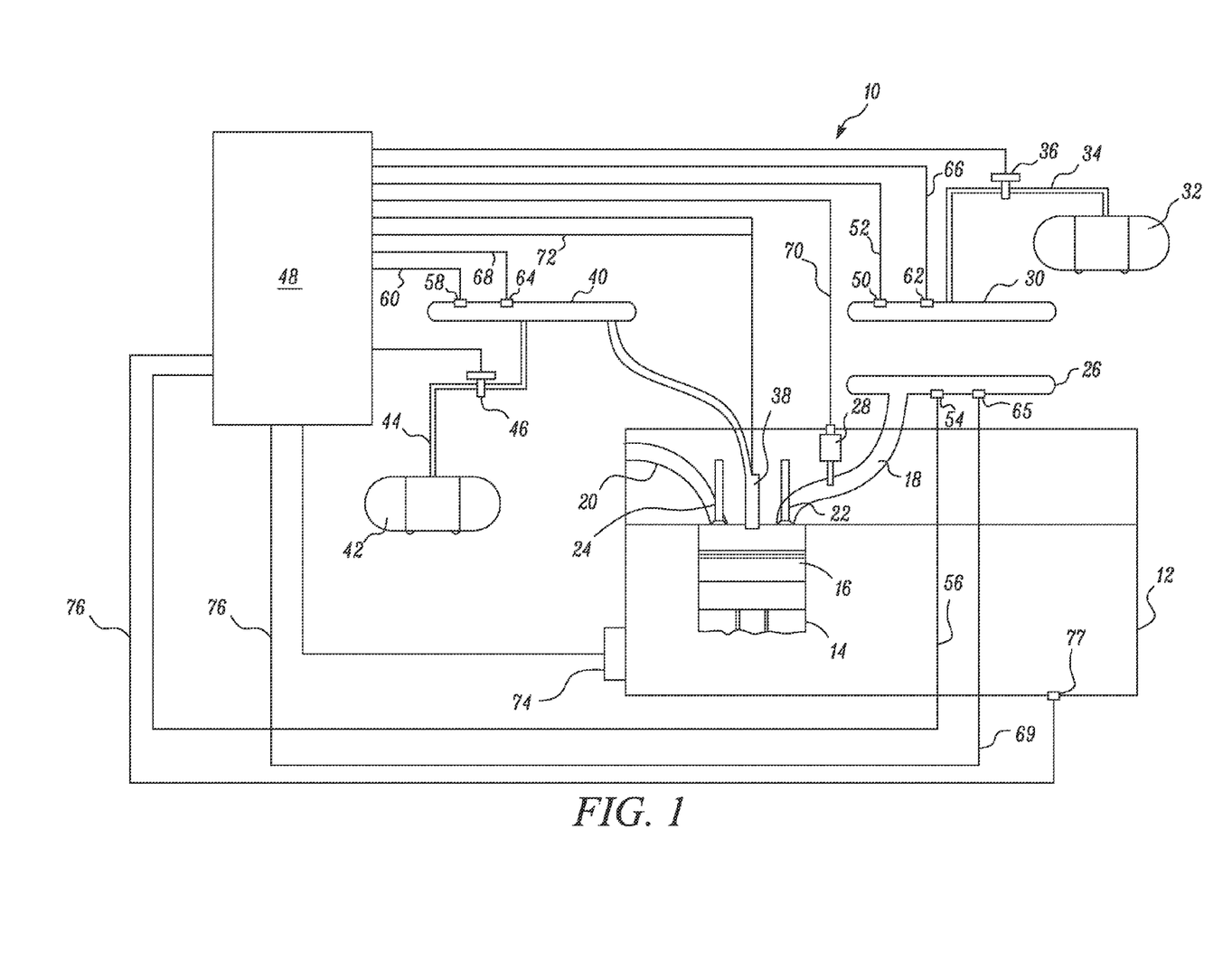
FIG. 1 is a schematic view of an exemplary multi fuel engine system in accordance with the present disclosure.

Referring to the drawings, FIG. 1 depicts an exemplary multi fuel engine system 10 that may include an engine 12 with a representative cylinder 14 of a plurality of cylinders 14 implemented in the engine 12. Although only one cylinder 14 is shown, it is recognized that the actual number of cylinders 14 of the engine 12 could vary and that the engine 12 could be of the in-line type, V-type, or even a rotary type engine. A piston 16 is positioned for displacement within the cylinder 14, and the cylinder 14 includes an intake port 18, an exhaust port 20, and an intake valve 22 and an exhaust valve 24 regulating the fluid communication between the cylinder 14 and the intake port 18 and the exhaust port 20, respectively. The intake port 18 receives air from an air intake manifold 26 to which intake air travels after passing through, for example, an air filter (not shown) and turbo charger (not shown). A gaseous fuel admission valve 28 of a type commonly known in the art is positioned between a gaseous fuel manifold 30 at an upstream side and the intake port 18 at a downstream side. A nozzle portion of valve 28 may extend into the intake port 18 for delivering gaseous fuel thereto and mixing with the air from the air intake manifold 26. The gaseous fuel manifold 30 is connected to a gaseous fuel source 32 by a fuel path 34, and a solenoid operated gaseous fuel shut off valve 36 may be positioned along the fuel path 34. The gaseous fuel source 32 may provide any appropriate gaseous fuel that may be used in the multi fuel engine 12, such as natural gas, methane, hexane, pentane or any other gaseous hydrocarbon fuel. Although not shown, it is recognized that such a system might typically include a balance regulator positioned between the gaseous fuel source 32 and the gaseous fuel manifold 30 for regulating the gaseous fuel pressure at the upstream side of the gaseous fuel admission valve 28.

The engine 12 may further include a liquid fuel injector 38, such as an electronic unit injector, for injecting liquid fuel, such as diesel fuel, into the cylinder 14. The liquid fuel may be provided to the fuel injector 38 via a common rail 40 supplying each of the cylinders 14 of the engine 12 with pressurized liquid fuel transmitted to the common rail 40 from a pressurized liquid fuel source 42 via a liquid fuel path 44. A solenoid operated liquid fuel shut off valve 46 may be positioned along the liquid fuel path 44 to cut off the flow of liquid fuel if necessary. The exhaust port 20 fluidly connects the cylinder 14 to an emissions portion (not shown) of the multi fuel engine system 10 to discharge the exhaust created by the combustion of the fuels from the cylinder 14.

An electronic control module (ECM) 48 of the multi fuel engine system 10 may be connected to a gaseous fuel pressure sensor 50 via a conductive path 52, to an intake manifold pressure sensor 54 via a conductive path 56, and to a liquid fuel pressure sensor 58 via a conductive path 60 for receiving pressure indicative signals from the sensors 50, 54, 58. Such pressure sensors 50, 54, 58 are well known in the art and therefore a detailed description of the sensors 50, 54, 58 is not included herein. Temperature sensors 62, 64, 65 are also provided in the gaseous fuel manifold 30, the common rail 40, and the intake manifold 26 respectively, to provide temperature indicative signals to the ECM 48 via conductive paths 66, 68, 69 respectively. The ECM 48 is connected for controlling the gaseous fuel admission valve 28 by a conductive path 70 and is also connected for controlling the fuel injector 38 by a conductive path 72. In this regard it is known to include driver circuitry or software within the ECM 48 for delivering current control signals to the gaseous fuel admission valve 28 and the fuel injector 38 to control the flow rates of the corresponding fuels there through. However, it is recognized that such driver circuitry could be implemented separate from, but connected to, the ECM 48. An engine speed sensor 74 associated with a camshaft or other component of the engine 12 from which the engine speed may be determined may also be connected to the ECM 48 via conductive path 76 for delivering engine speed indicative signals thereto. A load sensor 77 may be operatively coupled to various components of the engine 12 such as, but not limited to, cam shaft, output shaft or other appropriate component to sense an engine load. Further, the load sensor 77 may be electrically connected to the ECM 48 by a conductive path 78 and transmit load indicative signals for the measured load. In one embodiment, the engine load may be determined from a reference map or lookup table or may be calculated based on engine speed, torque and the like.

The multi fuel engine system 10 as shown may operate in a liquid fuel mode or a multi fuel mode. In the liquid fuel mode, the gaseous fuel admission valve 28 remains closed while pressurized liquid fuel is injected into the cylinder 14 by the fuel injector 38 as the sole source of fuel energy during combustion. In the multi fuel mode, the gaseous fuel from the gaseous fuel source 32 is discharged into the intake port 18 by the gaseous fuel admission valve 28 and mixed with air from the air intake manifold 26, and a small amount or pilot amount of the pressurized liquid fuel is injected into the cylinder 14 at the fuel injector 38 in order to ignite the mixture of air and gaseous fuel. Those skilled in the art will understand that the configuration of the multi fuel engine system 10 shown in FIG. 1 and described herein is exemplary only, and other configurations are contemplated for implementation of the multi fuel engine control strategy in accordance with the present disclosure. For example, the multi fuel engine system 10 may be configured to be powered by additional types of gaseous and liquid fuels, and the multi fuel engine control strategy may be configured to allow specification of substitution ratios for apportioning the input power required by the engine 12 between the available fuels.

Figure 2:
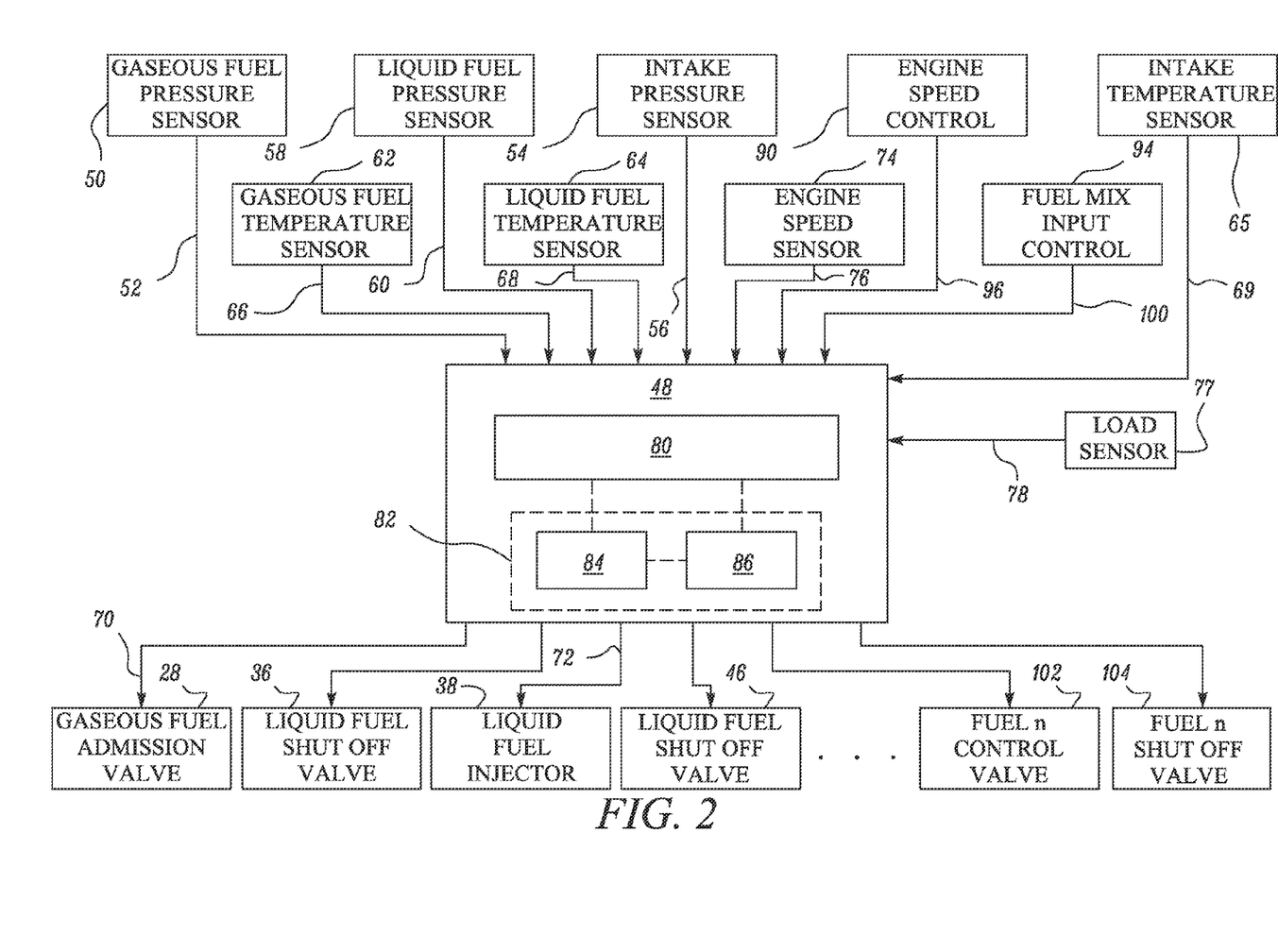
FIG. 2 is a schematic illustration of an exemplary electronic control unit and control components that may be implemented in the exemplary multi fuel engine system of FIG. 1.

FIG. 2 illustrates one exemplary configuration of the ECM 48 that may be implemented in the multi fuel engine system 10 to control the operation of the engine 12 and the apportionment of fuels to provide the required power to the engine 12, and, if desired, to control the operations of other systems that are integrated with the multi fuel engine system 10. The ECM 48 may include a microprocessor 80 for executing specified programs that control and monitor various functions associated with the system 10. The microprocessor 80 includes a memory 82, such as a read only memory (ROM) 84, for storing a program or programs, and a random access memory (RAM) 86 which serves as a working memory area for use in executing the program(s) stored in the memory 82. Although the microprocessor 80 is shown, it is also possible and contemplated to use other electronic components such as a microcontroller, an ASIC (application specific integrated circuit) chip, or any other integrated circuit device.

The ECM 48 electrically connects to the control elements of the multi fuel engine system 10, as well as various input devices for commanding the operation of the engine 12 and monitoring its performance. As a result, the ECM 48 may be electrically connected to the pressure sensors 50, 54, 58, the temperature sensors 62, 64, 65, the engine speed sensor 74 and the load sensor 77 as discussed above to receive parameter value indicative signals relating to the operating conditions of the engine 12. The ECM 48 may also be electrically connected to input devices such as, for example, an engine speed control 90, a fuel mix input control 94 via conductive paths 96, 100, respectively. An operator of the multi fuel engine system 10 may manipulate the controls 90, 94 to generate and transmit control signals to the ECM 48 with commands for operating the engine 12 as desired to produce the necessary engine speed with a desired apportionment of the available fuels. The engine speed control 90 may be any type of input device allowing an operator to specify a speed at which the engine 12 should operate to provide the output necessary to perform a desired task. For example, the engine speed control 90 could be a gas pedal of a vehicle or excavating machine, a thrust lever of an airplane, or other appropriate input device for specifying the speed of the engine 12.

The fuel mix input control 94 may be any appropriate input device allowing an operator, technician or other user of the multi fuel engine system 10 to input information regarding the apportionment of the fuels available for use by the system 10. The fuel mix data input at the fuel mix input control 94 may specify fuel substitution ratios or fractions for usage of each of the available fuels for meeting the desired engine speed input power necessary to operate the engine 12 at the engine speed specified at the engine speed control 90. For example, in a dual fuel engine operating with a gaseous fuel (e.g., natural gas) and a liquid fuel (e.g., diesel fuel), it may be desired to have the gaseous fuel provide 80% of the power requirement and have the liquid fuel provide the remaining 20% of the power requirement. In such a case, a substitution ratio of 20%, or 0.20, may be input at the fuel mix input control 94 and stored at the ECM 48 so that the liquid fuel will be substituted for the gaseous fuel and provide 20% of the power. Where more fuels are available, a fuel substitution ratio or fraction may be input for each fuel, with the individual substitution ratios totaling 100%, or 1.00, so that the power supplied by the individual fuels adds up to the total input power required for the engine 12.

The memory 82 of the ECM 48 may include information regarding one or more fuel properties of a pre-determined fuel type available for use by the system 10. The fuel property data input may include any data necessary for the system 10 to determine an amount of a fuel necessary for producing an amount of power in the engine 12 to meet a power requirement determined as discussed further below. Examples of fuel property data that may be specified for a fuel available to the engine 12 include the density or specific gravity of the fuel, the heat of combustion of the fuel expressed as, for example, a lower or higher heating value indicating the energy released by the fuel per unit of mass or volume, and the like. The one or more fuel properties for each of the n available fuels may be stored in the memory 82 of the ECM 48 or other databases and communicated to the ECM 48. The one or more fuel properties of the predetermined fuel type may be based on experimentation of the pre-determined fuel type during a laboratory test. The fuel properties of the pre-determined fuel currently used in the engine 12 may be different from the one or more fuel properties stored in the memory 82.

The ECM 48 may be configured to determine a mass flow rate $\dot{m}_c$ for each of plurality of fuels available for use by the system 10. The mass flow rate $\dot{m}_c$ is dependent on the required input power, one or more fuel properties of a pre-determined fuel type, and a specified fuel substitution ratio for apportioning the plurality of fuels to the multi fuel engine 12. However, fuel properties of the fuels currently used in the engine 12 may be different from the one or more fuel properties of the pre-determined fuel type. The ECM 48 is configured to determine a correction factor for the mass flow rate $\dot{m}_c$ based on a desired charge density of the engine 12. The desired charge density may be a charge density associated with the mixture of the pre-determined fuel type and air in the air intake manifold 26. The desired charge density may be based on a relationship of charge density with at least one of the engine load, a measured engine speed, a desired air flow, and type of fuel currently being used in the multi fuel engine 12. The ECM 48 may refer to a reference map or look up table stored in the memory 82 to determine the desired charge density.

The ECM 48 may also be electrically connected to actuators and transmit control signals to the actuators to cause the various elements of the multi fuel engine system 10 to operate. Consequently, actuators for fluid flow control devices such as the gaseous fuel admission valve 28, the liquid fuel injector 38 and the shut off valves 36, 46 may be connected to the ECM 48 and receive control signals from the ECM 48 to operate the corresponding valves 28, 36, 46 and the fuel injector 38 to control flow of the gaseous and liquid fuels. Alternate implementations of the system 10 may allow the engine 12 to be powered by additional fuels that may be available. In those implementations, an additional fuel control valve 102 and a shut off valve 104 may be provided to control the flow of the additional fuels up to an $n^{th}$ fuel used in the system 10.

The ECM 48 and the accompanying control elements of FIG. 2 may be used to implement a fuel apportionment control strategy for the multi fuel engine system 10 that may provide the fuels to the engine 12 according to fuel mix data provided at the fuel mix input control 94. As may be seen from the schematic illustration of FIG. 3, the ECM 48 may be programmed with various control modules 106, 108, 110, for example, implementing the logic of the fuel apportionment control strategy. Though illustrated as being contained within a single ECM 48, the control modules 106, 108, 110, 112 may be distributed across multiple processing elements of the multi fuel engine system 10 if necessary based on the requirements of a particular implementation. However, for the purpose of illustration, the ECM 48 will be discussed herein as a single processing element.

Figure 3:
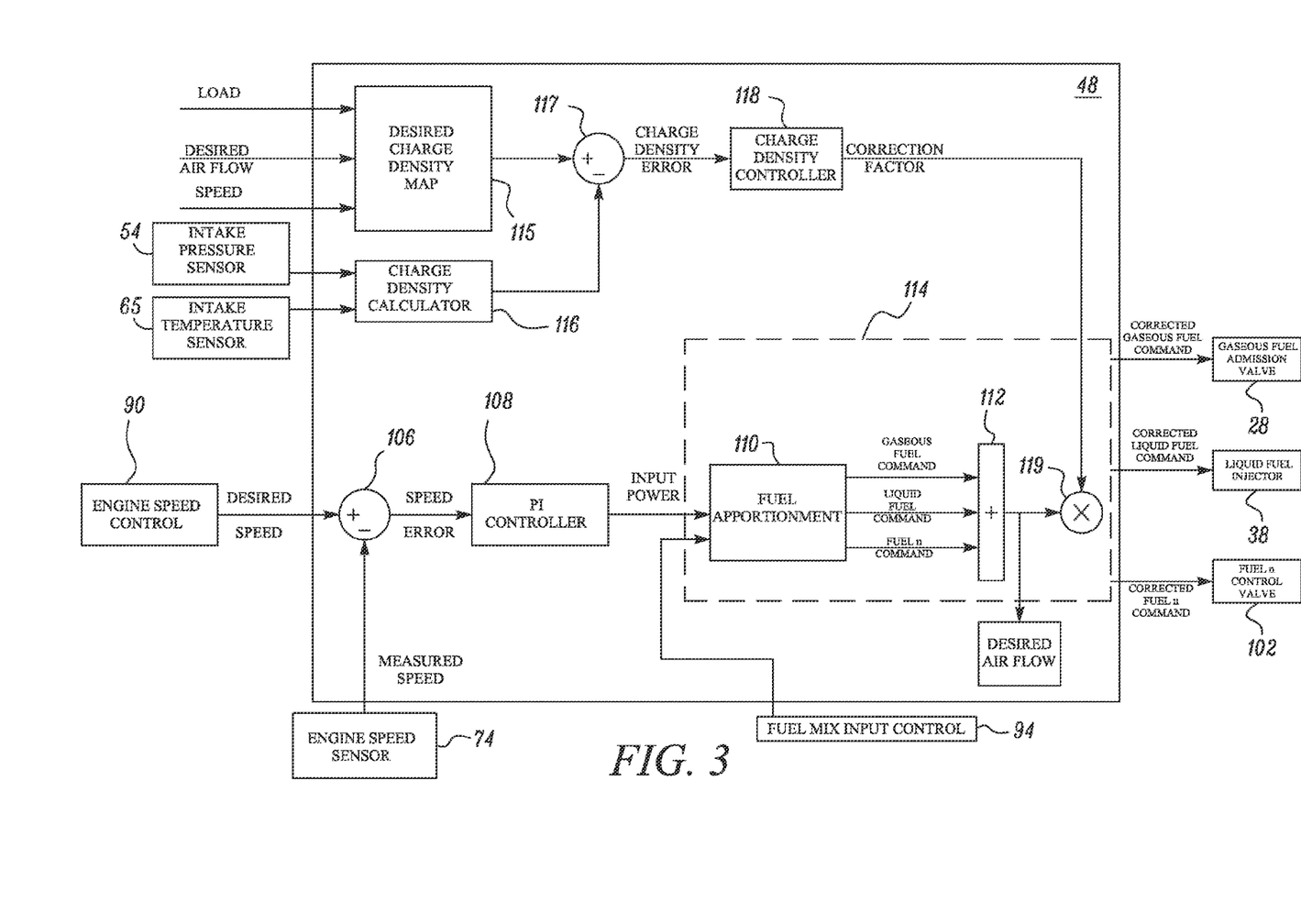
FIG. 3 is a schematic illustration of an exemplary fuel apportionment control strategy for the multi fuel engine system of FIG. 1.

The fuel apportionment strategy may begin at an adder 106 of the ECM 48 that may perform a comparison of the desired speed input at the engine speed control 90 and transmitted to the ECM 48 as an engine speed control signal to the current measure speed of the engine 12 provided to the ECM 48 by the engine speed sensor 74 via a measured engine speed control signal. The adder 106 may subtract the measured speed of the engine 12 from the desired speed to arrive at a speed error. The speed error may have a positive value if the engine 12 is running slower than desired or a negative value if the engine 12 is running faster than necessary. The speed error may occur due to a change in the commanded speed at the engine speed control 90, or due to a change in the actual speed of the engine 12 as measured by the engine speed sensor 74 caused by an event such as a change in the load or torque on the engine 12.

The calculated speed error may be transmitted from the adder 106 to a single proportional-integral (PI) controller 108 of the ECM 48. The PI controller 108 may be configured to use the desired speed and the speed error to determine an input power to be provided by the available fuels to cause the actual or measured engine speed to increase or decrease toward the desired engine speed at a response rate specified during the configuration of the PI controller 108. The specific programming of the PI controller 108 to calculate the input power for the engine 12 is within the understanding of those skilled in the art, and a detailed discussion of PI controller programming methods is not provided herein. However, it was not known in previous multi fuel engine systems to provide a single PI controller 108 to calculate an input power for the engine prior to determining the apportionment of the available fuels as discussed herein. It should be noted also that the use of the PI controller 108 is exemplary, and other types of controllers and control calculations capable of determining an input power for the engine 12 may be implemented in the fuel apportionment control strategy in accordance with the present disclosure.

The input power determined by the PI controller 108 for the engine 12 may be used, along with other input data, by a fuel apportionment module 110 to apportion the power demand between the available fuels. The fuel apportionment module 110 may also use data input at the fuel mix input control 94 and the one or more fuel properties of a pre-determined fuel type in determining the amount of each fuel to be provided to the engine 12. In one implementation, the fuel property data may include a measure of the chemical energy content or fuel quality of the fuel in the form of a lower heating value $LHV_i$, a measure of the fuel's density, such as the mass density $D_i$ or specific gravity $SG_i$ of the $i^{th}$ fuel, and any other fuel property data necessary to accurately regulate the flow of the fuels per the calculated apportionment. The fuel mix data entered at the fuel mix input control 94 indicates the portion of the input power to be provided by each of the n available fuels. To facilitate adaptability for use of additional or alternate fuels in the multi fuel engine 12, the system 10 may be configured to allow the operator to enter a fuel substitution ratio $FSR_i$ at the fuel mix input control 94 for each of the n fuels. Each fuel substitution ratio $FSR_i$ may have a value between 0.00 and 1.00 representing the portion of the required input power to be provided by the corresponding fuel. To ensure that 100% of the input power requirement is provided by the fuels, and that excess fuel is not provided to the engine 12, the ECM 48 and the fuel mix input control 94 may be configured to restrict entry of values of the fuel substitution ratio $FSR_i$ to those satisfying the equation:

$$\Sigma_{i=1}^{n} FSR_i = 1 \tag{1}$$

As will be discussed below, a value of the fuel substitution ratio $FSR_i$ equal to 0.00 indicates that the $i^{th}$ fuel will not be used to provide power to the engine 12, and a value of the fuel substitution ratio $FSR_i$ equal to 1.00 indicates that the $i^{th}$ fuel will provide 100% of the input power to the engine 12 without substitution of any of the other available fuels.

When the input power is transmitted to the fuel apportionment module 110 from the PI controller 108, the fuel apportionment module 110 retrieves the fuel property and fuel mix data necessary to apportion the available fuels. The fuel apportionment module 110 uses the data to determine a fuel flow rate $\dot{m}_i$ for each fuel. In an embodiment, the fuel flow rate $\dot{m}_i$ for each of the plurality of fuels may be a mass flow rate. The fuel apportionment module 110 may determine the fuel flow rate $\dot{m}_i$ based on the following equation:

$$\dot{m}_i = \frac{FSR_i \times \text{Input Power}}{LHV_i} \qquad (2)$$

where $FSR_i$ is the unitless fuel substitution ratio for the $i^{th}$ fuel, Input Power is the commanded power transmitted from the PI controller 108 having units of energy per unit of time, and $LHV_i$ is the lower heat value for the $i^{th}$ fuel having units of energy per unit of mass. Equation (2) yields the fuel flow rate $\dot{m}_i$ in mass per unit of time required for each of the i fuels to provide the required portion of the commanded power to the engine 12.

In the exemplary dual fuel engine 12, the engine 12 may primarily run on natural gas and have diesel fuel available as a backup or secondary fuel source to power the engine 12 or to provide a pilot amount of fuel to ignite the gaseous fuel and air mixture. In such dual fuel engines 12, the fuel apportionment control strategy may be modified to acknowledge the design of the engine 12 and the use of exactly two fuels to provide power to the engine 12. The fuel property data stored in the memory 82 may include a lower heat valve $LHV_{NG}$ and a specific gravity $SG_{NG}$ for the natural gas supply, and a lower heat value $LHV_D$ and a specific gravity $SG_D$ for the diesel fuel among other relevant fuel property data. The fuel mix data entered at the fuel mix input control 94 indicates the portion of the input power to be provided by the natural gas and the diesel fuel. Where the engine 12 is designed for only two fuels, a single fuel substitution ratio FSR may be used to indicate the amount of the secondary fuel source to substitute for the primary fuel source. Consequently, in the exemplary natural gas/diesel fuel dual fuel engine 12, a fuel substitution ratio FSR equal to 20%, or 0.20, for example, may be specified at the fuel mix input control 94 to supply power to the engine 12 at an 80% natural gas/20% diesel fuel apportionment.

In the duel fuel engine 12 example, the calculation of the fuel flow rates of the fuels performed at the fuel apportionment module 110 may also be modified to account for the use of two fuels and the input of a single fuel substitution ratio FSR. In this implementation, equation (2) may be modified into separate fuel flow rate m equations for the primary and secondary fuels. The secondary diesel fuel flow rate $\dot{m}_D$ may be calculated as follows:

$$\dot{m}_D = \frac{FSR \times \text{Input Power}}{LHV_D} \qquad (3)$$

The equation for determining the primary natural gas fuel flow rate $\dot{m}_{NG}$ may also utilize the single fuel substitution ratio FSR as follows:

$$\dot{m}_{NG} = \frac{(1-FSR) \times \text{Input Power}}{LHV_{NG}} \qquad (4)$$

Using equations (3) and (4), the fuel flow rates $\dot{m}_{NG}$, $\dot{m}_D$ will yield 100% of the commanded input power output from the PI controller 108.

Further, the ECM 48 may determine a desired air flow required to provide the input power to the engine 12. The fuel flow rate $\dot{m}_i$ for each available fuel may be received by an adder 112 to determine a composite fuel flow command. The desired air flow may then be calculated as follows $$\text{Desired air flow=Desired AFR*(Composite Fuel Flow Command)} \qquad (4)$$

where AFR is Air to Fuel Ratio. The ECM 48 may be configured to covert the desired air flow into a control signal that may cause an Air to Fuel Ratio Controller (not shown) to output air flow at the appropriate rate.

After determining the fuel flow rate $\dot{m}_i$ for each available fuel and the desired air flow, the ECM 48 may need to determine the correction factor for the fuel flow rate $\dot{m}_i$. The ECM 48 may then output the corrected fuel flow rate $\dot{m}_c$ based on the determined correction factor for each of the plurality of fuels. Subsequently, a fuel apportionment block 114 may receive the corrected fuel flow rate $\dot{m}_c$ for each of the plurality of fuels and formats commands for the actuators of the fuel flow control devices 28, 38, 102 to cause the devices to provide the corrected fuel flow to the engine 12.

As shown in FIG. 3, the ECM 48 may determine the correction factor for the fuel flow rate $\dot{m}_i$ based on the desired charge density. The desired charge density for the pre-determined fuel may be determined based on a relationship between a charge density and at least one of the engine load, the measured engine speed, the desired air flow and the like. The ECM 48 may refer to a desired charge density map 115 corresponding to the pre-determined fuel and at least one of the engine load, the measured engine speed, the desired air flow to determine the desired charge density.

Further, a charge density calculator 116 may determine the calculated charge density based on the intake manifold pressure Pi and the intake manifold temperature Ti. The calculated charge density may be related to the intake manifold pressure Pi and the intake manifold temperature Ti as follows:

$$\text{Calculated charge density } \alpha Pi/Ti \qquad (4)$$

Subsequently, an adder 117 may perform a comparison of the desired charge density to the calculated charge density. The adder 117 may subtract the calculated engine charge density from the desired charge density to arrive at a charge density error. The charge density error may occur due to a change in the one or more fuel properties of the fuel in the engine 12. The calculated charge density error may be transmitted from the adder 117 to a charge density controller 118. The charge density controller 118 may be configured to use the desired charge density and the charge density error to determine a correction factor. In an embodiment, the charge density controller 118 may be a proportional-integral (PI) controller of the ECM 48. The specific programming of the charge density controller 118 to calculate the correction factor for the engine 12 is within the understanding of those skilled in the art, and a detailed discussion of charge density controller 118 programming methods is not provided herein. In various other embodiments, other types of controllers and control calculations capable of determining a correction factor for the fuel flow rate $\dot{m}_i$ may be implemented in the ECM 48 in accordance with the present disclosure. A non-zero charge density error may drive the charge density controller 118 to determine the correction factor. Further, the charge density controller 118 may be configured to determine the correction factor to drive the charge density error to zero.

Alternatively, the charge density controller 118 may be configured to output the corrector factor as 1 if the charge density error is zero. In an embodiment, the charge density controller 118 may be configured to output the corrector factor as 1 if the charge density error is within a pre-determined range. It should be noted that the charge density controller 118 may be configured to output the correction factor such that the fuel flow rate $\dot{m}_f$ remains unchanged after applying the correction factor if the charge density error is zero or with in the pre-determined range. In another embodiment, the ECM 48 may continue to output the fuel commands based on the determined fuel flow rate $\dot{m}_f$, if the charge density error is zero or with in the pre-determined range.

In an alternative embodiment, the ECM 48 may determine the correction factor for the fuel flow rate based on a desired intake manifold pressure. The ECM 48 may determine the desired intake manifold pressure based on a relationship between an intake manifold pressure and at least one of the engine speed, the engine load, the desired air flow etc. The ECM 48 may refer to a reference map or a look up table to determine the desired intake manifold pressure. The ECM 48 may also be configured to receive the measured intake manifold pressure Pi from the intake manifold pressure sensor 54.

The adder 117 may perform a comparison of the desired intake manifold pressure to the measured intake manifold pressure Pi. The adder 117 may subtract the measured intake manifold pressure Pi from the desired intake manifold pressure to arrive at an intake manifold pressure error. The intake manifold pressure error may occur due to a change in the one or more fuel properties of the fuel in the engine 12. The calculated intake manifold pressure error may be transmitted from the adder 117 to an intake manifold pressure controller (not shown). The intake manifold pressure controller may be configured to use the desired intake manifold pressure and the intake manifold pressure error to determine a correction factor. In an embodiment, the intake manifold pressure controller may be a proportional-integral (PI) controller of the ECM 48. The specific programming of the intake manifold pressure controller to calculate the correction factor for the engine 12 is within the understanding of those skilled in the art, and a detailed discussion of intake manifold pressure controller programming methods is not provided herein. In various other embodiments, other types of controllers and control calculations capable of determining a correction factor for the fuel flow rate may be implemented in accordance with the present disclosure. A non-zero intake manifold pressure error may drive the intake manifold pressure controller to determine the correction factor. Further, the intake manifold pressure controller 118 may be configured to determine the correction factor to drive the intake manifold pressure error to zero.

Alternatively, the intake manifold pressure controller may be configured to output the correction factor as 1, if the intake manifold pressure error is zero. In one embodiment, the intake manifold pressure controller may be configured to output the correction factor as 1 if the intake manifold pressure error is within a pre-determined range. It should be noted that the intake manifold pressure controller may be configured to output the correction factor such that the fuel flow rate $\dot{m}_f$ remains unchanged after applying the correction factor. In another embodiment, the ECM 48 may continue to output the fuel commands based on the determined fuel flow rate $\dot{m}_f$, if the intake manifold pressure error is zero or with in the pre-determined range.

The ECM 48 may determine the corrected fuel flow rate $\dot{m}_c$ for each of the plurality of fuels based on the determined correction factor. Accordingly, the fuel apportionment block 114 of the ECM 48 may receive the correction factor. The adder 112 of the fuel apportionment block 114 may determine the composite fuel flow command based on the fuel flow rate $\dot{m}_f$. Further, a multiplier 119 of the fuel apportionment block 114 may be configured to apply the correction factor to the composite fuel flow command to determine a modified fuel flow command. The fuel apportionment block 114 may then calculate the corrected fuel flow rate $\dot{m}_c$ for each of the plurality of the fuels based on the modified fuel flow command. The fuel apportionment block 114 may then output the corrected fuel flow rate $\dot{m}_c$ for each of the plurality of the fuels.

The fuel apportionment block 114 may be configured to convert each corrected fuel flow rate $\dot{m}_c$ onto a control signal that will cause the corresponding fuel flow control device 28, 38, 102 to output fuel at the appropriate rate. The conversions in the fuel apportionment block 114 may incorporate lookup tables, conversion equations utilizing additional fuel properties, or any other appropriate conversion logic necessary to generate the control signals. As shown in FIG. 3, the fuel apportionment block 114 may transmit a separate control signal to each of the fuel flow control devices 28, 38, 102. Subsequently, a gaseous fuel command may be transmitted to the gaseous fuel admission valve 28 to cause the valve 28 to open to the position necessary to add the appropriate amount of gaseous fuel to the intake air in the intake port 18 and subsequently to the cylinder 14. Similarly, the liquid fuel command may be transmitted to the liquid fuel injector 38 to cause the injection of the required amount of liquid fuel into the combustion chamber of the cylinder 14. For each additional available fuel up to the $n^{th}$ fuel, the fuel apportionment block 114 transmits a fuel command to the corresponding fuel control valve 102. For each fuel having a fuel substitution ratio $FSR_i$, and correspondingly a fuel flow rate $\dot{m}_i$, equal to zero, the fuel apportionment block 114 transmits a fuel command causing the corresponding fuel flow control device 28, 38, 102 to prevent fuel flow to the engine 12.

In one embodiment, the ECM 48 may determine the fuel flow rate $\dot{m}_f$, and subsequently the corrected fuel flow rate $\dot{m}_c$, even when the engine speed control 90 is absent or not operational. The ECM 48 may calculate the input power based on the measured engine speed. The ECM 48 may then use the calculated input power to determine the corrected fuel flow rate $\dot{m}_c$, for each of the plurality of fuels required so as to generate the input power required to operate the engine 12 at the measured engine speed. In another embodiment, the engine speed control 90 and at least the ECM 48 controls essential for determining the corrected fuel flow rate $\dot{m}_c$, may operate simultaneously. Therefore the ECM 48 may use the input power determined based on the engine speed error by the engine speed control 90 to determine the fuel flow rate $\dot{m}_f$, and subsequently determine the corrected fuel flow rate $\dot{m}_c$. In various other embodiments, the ECM 48 controls used for determining the corrected fuel flow rate $\dot{m}_c$, may be selectively initiated under pre-determined conditions. The pre-determined conditions may include but not limited to, the ECM 48 detecting that at least one of the available fuels in the engine is changed or a pre-set duration of time has lapsed or the engine load is changed.

INDUSTRIAL APPLICABILITY

Figure 4:
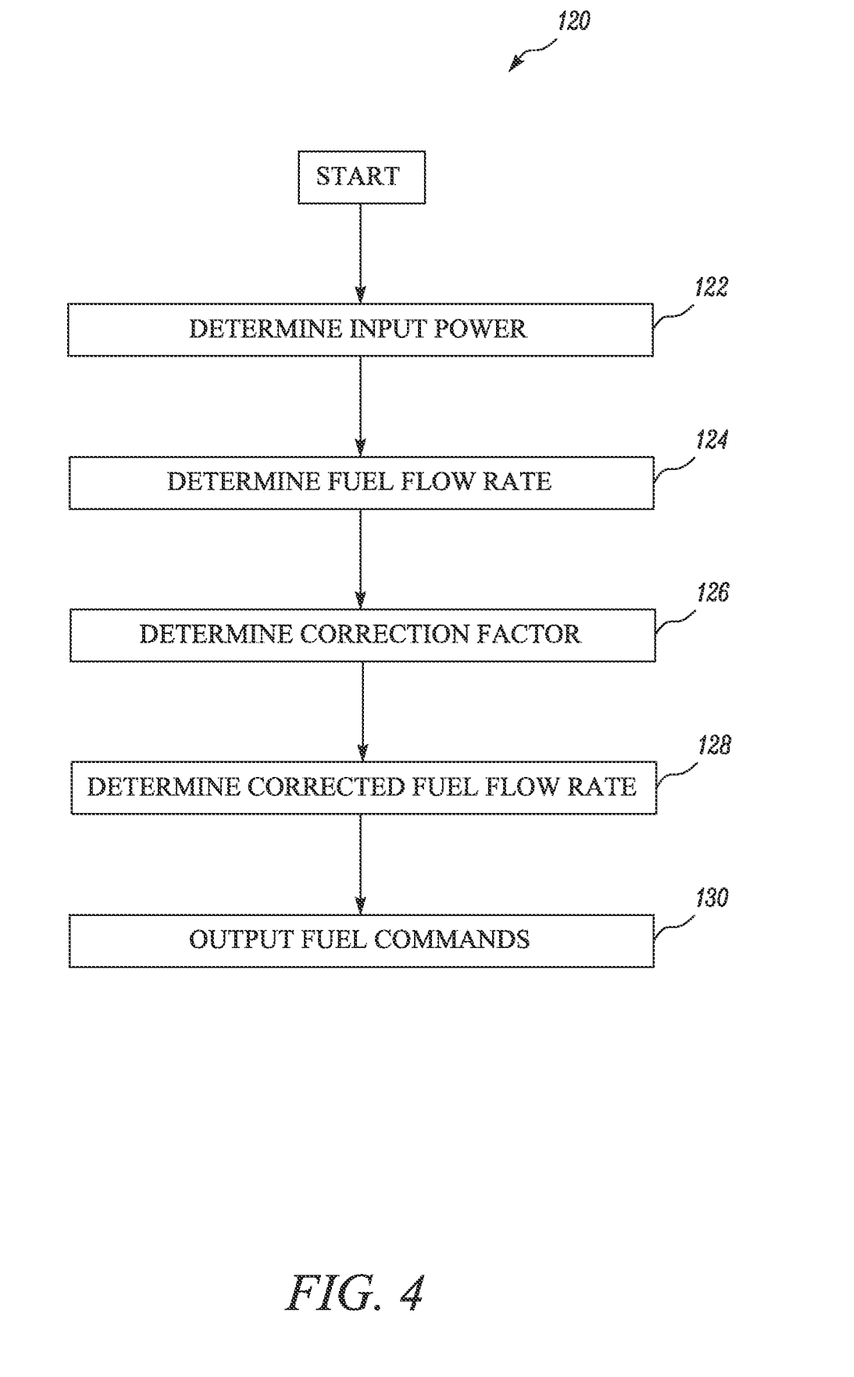
FIG. 4 is a flowchart of an exemplary fuel apportionment control routine that may be implemented in the multi fuel engine system of FIG. 1.

For proper operation of the multi fuel engine system 10 configured as described above, the ECM 48 may be programmed with a fuel apportionment routine 120 such as that illustrated in FIG. 4. The fuel apportionment routine 120 may begin at block 122 where the ECM 48 determines the input power to the engine 12 for the measured engine speed. In an embodiment, the ECM 48 may calculate the input power based on the engine speed error. Accordingly, the ECM 48 may receive the control signal from the engine speed control 90 indicating the desired speed, and the engine speed indicative signal from the engine speed sensor 74 indicating the measured engine speed. The desired speed and the measured speed may be input to the adder 106 to determine the engine speed error. The engine speed error determined by the adder 106 may be output to the PI controller 108 to determine whether the desired and measured engine speeds are different such that the input power provided to the engine 12 by the available fuels must be recalculated.

If the desired speed matches the measured speed and the speed error is equal to zero, it may not be necessary to change the input power to the engine 12 and the ECM 48 may continue receiving and evaluating the desired and measured engine speeds. In alternative embodiments, an amount of speed error may be acceptable so that a recalculation of the input power for the engine 12 is not required. In such cases, the ECM 48 may be configured with a range of speed error values that will cause the ECM 48 to output the input power for the engine 12 without any recalculation. The speed error value range may be centered around a speed error value of zero, or may be offset from zero if a greater amount of tolerance exists for speed errors that have either positive values (i.e., the engine 12 is running too slow) or negative values (i.e., the engine 12 is running too fast). In such cases, where the speed error is zero or within the acceptable range, the ECM 48 may output the input power at block 122 without any recalculation. Otherwise, if the ECM 48 determines that a non-zero speed error exists, or that the speed error is outside a range of acceptable values, the speed error may be input to the PI controller 108 to determine the updated input power required to cause the engine 12 to operate at the desired engine speed as discussed above. The ECM 48 may output the updated input power at block 122.

After the input power is determined at the block 122, control passes to a block 124 where the input power is input to the fuel apportionment module 110 to determine the fuel flow rate $\dot{m}_i$, for each of the plurality of fuels that are available for providing power to the multi fuel engine 12. The fuel flow rate $\dot{m}_i$, may be determined based on the input power, fuel property data stored in the ECM 48 and the fuel mix data input at the fuel mix input control 94. The fuel apportionment is determined using calculations such as those provided in equations (2)-(4) to arrive at the amount of each available fuel to be provided to the engine 12 to generate the input power required to operate the engine 12 at the measured engine speed.

After determining the fuel apportionment, control may pass to a block 126 where the ECM 48 may determine a correction factor for the determined fuel flow rate $\dot{m}_i$. The ECM 48 may determine the correction factor based on the desired charge density and the calculated charge density. Accordingly, the ECM 48 may receive control signals indicating at least one of the control signal indicating the engine speed, the engine load, the intake manifold temperature Ti, the intake manifold pressure Pi. In an embodiment the ECM 48 may determine the desired air flow. The ECM 48 may determine the desired air flow based on the determined fuel flow rate $\dot{m}_i$. The desired air flow is determined using calculations provided in equation (5). The ECM 48 may then determine the desired charge density based on at least one of the received engine speed, the engine load, and the desired air flow by referring to the desired charge density map 115. Further, the charge density calculator 116 may determine the calculated charge density based on the intake manifold temperature Ti and the intake manifold pressure Pi.

The desired charge density and the calculated charge density may be input to the adder 117 to determine the charge density error. If the desired charge density matches the calculated charge density and the charge density error is equal to zero at the block 126, the ECM 48 may determine the correction factor to be '1'. In alternative embodiments, an amount of charge density error may be acceptable so that the correction to fuel flow rate $\dot{m}_i$ is not required. In such cases, the ECM 48 may be configured with a range of charge density error values that will cause the ECM 48 to determine the correction factor to be '1'. Otherwise, if the ECM 48 determines that a non-zero charge density error exists, or that the charge density error is outside a range of acceptable values, the charge density error is input to the charge density controller 118 to determine the correction factor.

After determining the correction factor, the control may pass to block 128 where the ECM 48 may determine the corrected flow rate $\dot{m}_c$ for each of the plurality of fuels. Accordingly, the correction factor determined at the block 126 may be input to the multiplier 119. The multiplier 119 may apply the correction factor to the composite fuel command to determine the modified fuel command. Further, the ECM 48 may determine the corrected fuel flow rate $\dot{m}_c$ for each of the plurality of fuels based on the modified fuel command required to cause the engine 12 to operate at the desired engine speed. After the corrected fuel flow rate $\dot{m}_c$ is determined at the block 128, control passes to a block 130 where the fuel apportionment block 114 outputs the fuel commands based on the corrected fuel flow rate $\dot{m}_c$. The fuel apportionment block 114 outputs the fuel commands to each of the fuel flow control devices 28, 38, 102 of the engine 12, such as the gaseous fuel admission valve 28, the liquid fuel injector 38 and the fuel control valves 102, to cause the devices to provide the various fuels to the engine 12 at the appropriate rates. After transmitting the output commands, control passes back to the block 122 to continue determining the input power and adjusting the fuel commands as necessary.

In an alternative embodiment, in the ECM 48 the control may be selectively passed from the block 124 to either the block 130 or the block 126. The control may be passed from the block 124 to the block 126 under certain pre-determined conditions. The pre-determined conditions may include but not limited to the ECM 48 detecting that at least one of the available fuel in the engine is changed or a pre-set duration of time has lapsed or the engine load is very high. In an absence of the pre-determined conditions, the control may be passed from the block 124 to the block 130. In such a case, the ECM 48 may determine the fuel flow rate $\dot{m}_i$ for each of the plurality of fuels and outputs fuel commands based on the determined fuel flow rate $\dot{m}_i$.

The presently disclosed multi fuel engine system 10, including the fuel apportionment routine 120, determines the appropriate fuel apportionment to achieve a desired fuel mixture using only a single PI controller 108. The single PI controller 108 determines the input power required to operate the multi fuel engine 12 at a desired engine speed, and the fuel apportionment block 114 performs the fuel flow calculations of equations (2)-(4) as necessary to apportion the input power between the available fuels. The present system 10 eliminates the complex switching logic and conflicts between multiple PI controllers each generating a fuel command for the corresponding fuels to supply 100% of the input power to the multi fuel engine 12 that exist in previous multi fuel engine systems. This approach simplifies the process for configuring the ECM 48 to control the operation of the multi fuel engine 12.

In the disclosed multi fuel engine system 10, the ECM 48 may automatically determine the corrected fuel flow rate $\dot{m}_c$ without the operator needing to input the fuel property data. The fuel quality for an unknown fuel may be determined and the fuel flow rate may be corrected based on the determined fuel quality. Also, any changes in the fuel quality for the fuel during the operation of the engine 12 may also be captured.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

What is claimed is:

1. A method for controlling fuel flow in a multi fuel engine, comprising:
   determining an input power for operating the multi fuel engine at a desired engine speed;
   determining a fuel flow rate for each of a plurality of fuels that are available for providing power to the multi fuel engine based on the input power, one or more fuel properties of a pre-determined fuel type, and a specified fuel substitution ratio for apportioning the plurality of fuels to the multi fuel engine;
   determining a correction factor for the fuel flow rate based on a desired charge density, wherein the desired charge density is based at least on a relationship between an engine load and a calculated charge density of the multi fuel engine; and
   outputting a corrected fuel flow rate, based on the determined correction factor, for each of the plurality of fuels to a corresponding actuator of a fluid flow control device for the one of the plurality of fuels to cause the corresponding actuator to provide the one of the plurality of fuels to the multi fuel engine at the corrected fuel flow rate.

2. The method of claim 1, wherein the one or more fuel properties of the pre-determined fuel type is based on experimentation of the pre-determined fuel type during a laboratory test.

3. The method of claim 1, wherein the desired charge density is further based on the engine load, type of fuel, measured engine speed, and desired air flow.

4. The method of claim 1, wherein determining the correction factor comprises:
   receiving the desired charge density;
   determining the calculated charge density of the multi fuel engine;
   determining a charge density error equal to a difference between the desired charge density and the calculated charge density; and
   determining the correction factor for the fuel flow rate based on the calculated charge density and the charge density error.

5. The method of claim 1, wherein the calculated charge density is based on an intake manifold pressure and an intake manifold temperature.

6. The method of claim 1, wherein determining the input power comprises:
   receiving the desired engine speed;
   determining a measured engine speed of the multi fuel engine;
   determining a speed error equal to a difference between the desired engine speed and the measured engine speed; and
   determining the input power based on the measured engine speed and the speed error.

7. The method of claim 1, wherein determining the fuel flow rate for each of the plurality of fuels comprises:
   determining a portion of the input power of the one of the plurality of fuels based on the specified fuel substitution ratio for the one of the plurality of fuels; and
   calculating the fuel flow rate for the one of the plurality of fuels by dividing the portion of the input power of the one of the plurality of fuels by a heat of combustion of the one of the plurality of fuels.

8. The method of claim 7, wherein outputting the corrected fuel flow rate for each of the plurality of fuels comprises:
   applying the correction factor to each of the determined fuel flow rate; and
   calculating a corrected fuel flow rate for each of the plurality of fuels.

9. A fuel flow control system for a multi fuel engine; comprising:
   an engine speed control configured to output an engine speed control signal indicating a desired engine speed;
   a plurality of actuators, wherein each of the plurality of actuators corresponds to a fluid flow control device for one of a plurality of fuels that are available for providing power to the multi fuel engine by causing a flow of the corresponding one of the plurality of fuels to the multi fuel engine; and
   a controller operatively connected to the engine speed control and the plurality of actuators, wherein:
      the controller is configured to store one or more fuel properties of a pre-determined fuel type;
      the controller is configured to store a specified fuel substitution ratio for apportioning the plurality of fuels to the multi fuel engine;
      the controller is configured to receive the engine speed control signal from the engine speed control;
      the controller is configured to determine an input power for operating the multi fuel engine at the desired engine speed;
      the controller is configured to determine a fuel flow rate for each of the plurality of fuels based on the input power, the one or more properties of the pre-determined fuel type and the specified fuel substitution ratio;

the controller is configured to determine a correction factor for the fuel flow rate based on a desired charge density, wherein the desired charge density is based at least on a relationship between an engine load and a calculated charge density of the plurality of fuels; and the controller is configured to output the corrected fuel flow rate for each of the plurality of fuels to the corresponding one of the plurality of actuators to cause the fluid flow control device to provide the one of the plurality of fuels to the multi fuel engine at the corrected fuel flow rate.

10. The engine fuel flow control system of claim 9, wherein the one or more fuel properties of the pre-determined fuel type is based on experimentation of the pre-determined fuel type during a laboratory test.

11. The engine fuel flow control system of claim 9, comprising an engine speed sensor operatively connected to the controller and operatively coupled to the multi fuel engine to detect a measured engine speed of the multi fuel engine, wherein the engine speed sensor is configured to output a measured engine speed control signal indicating the measured engine speed, wherein the controller is configured to receive the measured engine speed control signal from the engine speed sensor, to determine a speed error equal to a difference between the desired engine speed and the measured engine speed, and to determine the input power based on the measured engine speed and the speed error.

12. The engine fuel flow control system of claim 9 further comprises:
an intake manifold pressure sensor configured to provide an intake manifold pressure signal; and
an intake manifold temperature sensor operatively configured to provide an intake manifold temperature signal;
wherein the intake manifold pressure sensor and the intake manifold temperature sensor is connected to the controller and operatively coupled to the multi fuel engine, the controller is configured to measure an actual charge density of the multi fuel engine based on a relationship between the intake manifold pressure and intake manifold temperature.

13. The engine fuel flow control system of claim 9, wherein the desired charge density is based on the engine load, type of fuel, measured engine speed, and desired air flow.

14. The engine fuel flow control system of claim 13, wherein the controller is configured to determine the correction factor based on a difference of the desired charge density and the calculated charge density.

15. The engine fuel flow control system of claim 9, wherein the controller is further configured to:
apply the correction factor to each of the determined fuel flow rate; and
calculate a corrected fuel flow rate for each of the plurality of fuels.

16. A method for controlling fuel flow in a multi fuel engine, comprising:
receiving a desired engine speed for the multi fuel engine;
determining a measured engine speed for the multi fuel engine;
determining a speed error based on a difference between the desired engine speed and the measured engine speed;
determining an input power for operating the multi fuel engine at the desired engine speed based on the measured engine speed and the speed error;
determining a fuel flow rate for each of a plurality of fuels that are available for providing power to the multi fuel engine based on the input power, one or more fuel properties of a pre-determined fuel type and a specified fuel substitution ratio for apportioning the plurality of fuels to the multi fuel engine;
receiving an intake manifold pressure of the multi fuel engine;
receiving an intake manifold temperature of the multi fuel engine;
determining a calculated charge density based on the received intake manifold pressure and the received intake manifold pressure;
determining a desired charge density based on a relationship of charge density with at least one of an engine load, desired air flow, measured engine speed and a type of fuel;
determining a charge density error based on a difference between the calculated charge density and the desired charge density;
determining a correction factor for the fuel flow rate based on the calculated charge density and the charge density error; and
outputting a corrected fuel flow rate, based on the correction factor, for each of the plurality of fuels to a corresponding actuator of a fluid flow control device for the one of the plurality of fuels to cause the corresponding actuator to provide the one of the plurality of fuels to the multi fuel engine at the fuel flow rate.

17. The method of claim 16, wherein determining the input power comprises determining the input power in response to determining that the speed error is not equal to zero.

18. The method of claim 16, wherein determining the correction factor comprises determining the correction factor in response to determining that the charge density error is not equal to zero.

19. The method of claim 16, wherein the one or more fuel properties of the pre-determined fuel type is based on experimentation of the pre-determined fuel type during a laboratory test.

20. The method of claim 16 further comprises:
applying the correction factor to each of the determined fuel flow rate; and
calculating a corrected fuel flow rate for each of the plurality of fuels.

* * * * *